(12) United States Patent
Do

(10) Patent No.: US 10,322,730 B2
(45) Date of Patent: Jun. 18, 2019

(54) AIR CONDITIONING DEVICE FOR A DRIVING CABIN, IN PARTICULAR OF A RAILWAY VEHICLE

(71) Applicant: ALSTOM TRANSPORT TECHNOLOGIES, Saint-Ouen (FR)

(72) Inventor: Huu-Thi Do, Rochefort (FR)

(73) Assignee: ALSTOM TRANSPORT TECHNOLOGIES, Saint-Ouen (FR)

( * ) Notice: Subject to any disclaimer, the term of this patent is extended or adjusted under 35 U.S.C. 154(b) by 58 days.

(21) Appl. No.: 15/275,546

(22) Filed: Sep. 26, 2016

(65) Prior Publication Data

US 2017/0129505 A1 May 11, 2017

(51) Int. Cl.
| | |
|---|---|
| *B61D 27/00* | (2006.01) |
| *B61C 17/04* | (2006.01) |
| *B60H 1/00* | (2006.01) |
| *B62D 33/06* | (2006.01) |

(52) U.S. Cl.
CPC ..... *B61D 27/0018* (2013.01); *B60H 1/00357* (2013.01); *B60H 1/00564* (2013.01); *B61C 17/04* (2013.01); *B62D 33/06* (2013.01)

(58) Field of Classification Search
CPC .. B61C 17/04; B60H 1/00; B60H 1/32; B60K 1/04; B61D 27/00; B60J 7/00; B62D 33/06
USPC ..... 454/84, 121, 137, 138, 139; 62/241, 244
See application file for complete search history.

(56) References Cited

U.S. PATENT DOCUMENTS

| | | | | | |
|---|---|---|---|---|---|
| 1,985,636 | A | * | 12/1934 | Foss | B61D 27/0018 105/1.1 |
| 3,315,488 | A | * | 4/1967 | Lind | B60H 1/00378 62/241 |
| 4,344,356 | A | * | 8/1982 | Casterton | B60H 1/00378 165/42 |
| 4,641,502 | A | * | 2/1987 | Aldrich | B60H 1/00378 454/136 |

(Continued)

FOREIGN PATENT DOCUMENTS

| | | |
|---|---|---|
| DE | 296 00 512 U1 | 5/1997 |
| DE | 10 2010 062660 A1 | 6/2012 |

(Continued)

OTHER PUBLICATIONS

Price Industries Limited. "Engineering Guide Air Distribution. Section EG". 2011.*

(Continued)

*Primary Examiner* — Vivek K Shirsat
(74) *Attorney, Agent, or Firm* — Eric L. Lane; Green Patent Law

(57) ABSTRACT

The air conditioning device (10) includes a heat exchanger (12) intended to exchange heat with the air circulating in the air conditioning device (10), and an air distribution box (14), extending in a longitudinal direction (X) between a front part (14A) and a rear part (14B), and in a transverse direction between two side parts (14C). The distribution box is fastened to a ceiling (5) of the driving cabin (1), and comprises: in its front part (14A), a front inlet (16) for air coming from the cabin (1), connected upstream from the heat exchanger (12), and in each of its side parts (14C), a respective side outlet (18) for conditioned air, connected downstream from the heat exchanger (12).

7 Claims, 1 Drawing Sheet

(56) References Cited

U.S. PATENT DOCUMENTS

| | | | | |
|---|---|---|---|---|
| 4,721,031 A * | 1/1988 | Nakata | ............... | B62D 33/0617 |
| | | | | 296/190.09 |
| 4,724,748 A * | 2/1988 | Geyer | ................. | B60H 1/00371 |
| | | | | 454/120 |
| 5,184,474 A * | 2/1993 | Ferdows | ............ | B60H 1/00371 |
| | | | | 62/244 |
| 5,921,619 A * | 7/1999 | Cederberg | ......... | B60H 1/00378 |
| | | | | 296/190.09 |
| 6,508,702 B1 * | 1/2003 | Fabiano | ............ | B60H 1/00378 |
| | | | | 454/138 |
| 7,252,585 B2 * | 8/2007 | Ichikawa | ........... | B60H 1/00378 |
| | | | | 454/137 |
| 2011/0030406 A1 * | 2/2011 | Ichikawa | ........... | B60H 1/00378 |
| | | | | 62/244 |
| 2011/0297659 A1 * | 12/2011 | Bixler | .................... | F24H 3/081 |
| | | | | 219/201 |
| 2012/0247846 A1 * | 10/2012 | Ichikawa | ........... | B60H 1/00207 |
| | | | | 180/65.21 |

FOREIGN PATENT DOCUMENTS

| | | | | |
|---|---|---|---|---|
| EP | 298952 A2 * | 4/1988 | ............ | B61C 17/04 |
| EP | 0 298 952 A2 | 1/1989 | | |
| EP | 1 792 762 A1 | 6/2007 | | |
| FR | 2 890 002 A1 | 3/2007 | | |

OTHER PUBLICATIONS

Preliminary Search Report dated Aug. 10, 2016 in related French Application No. FR 15 59242.

\* cited by examiner

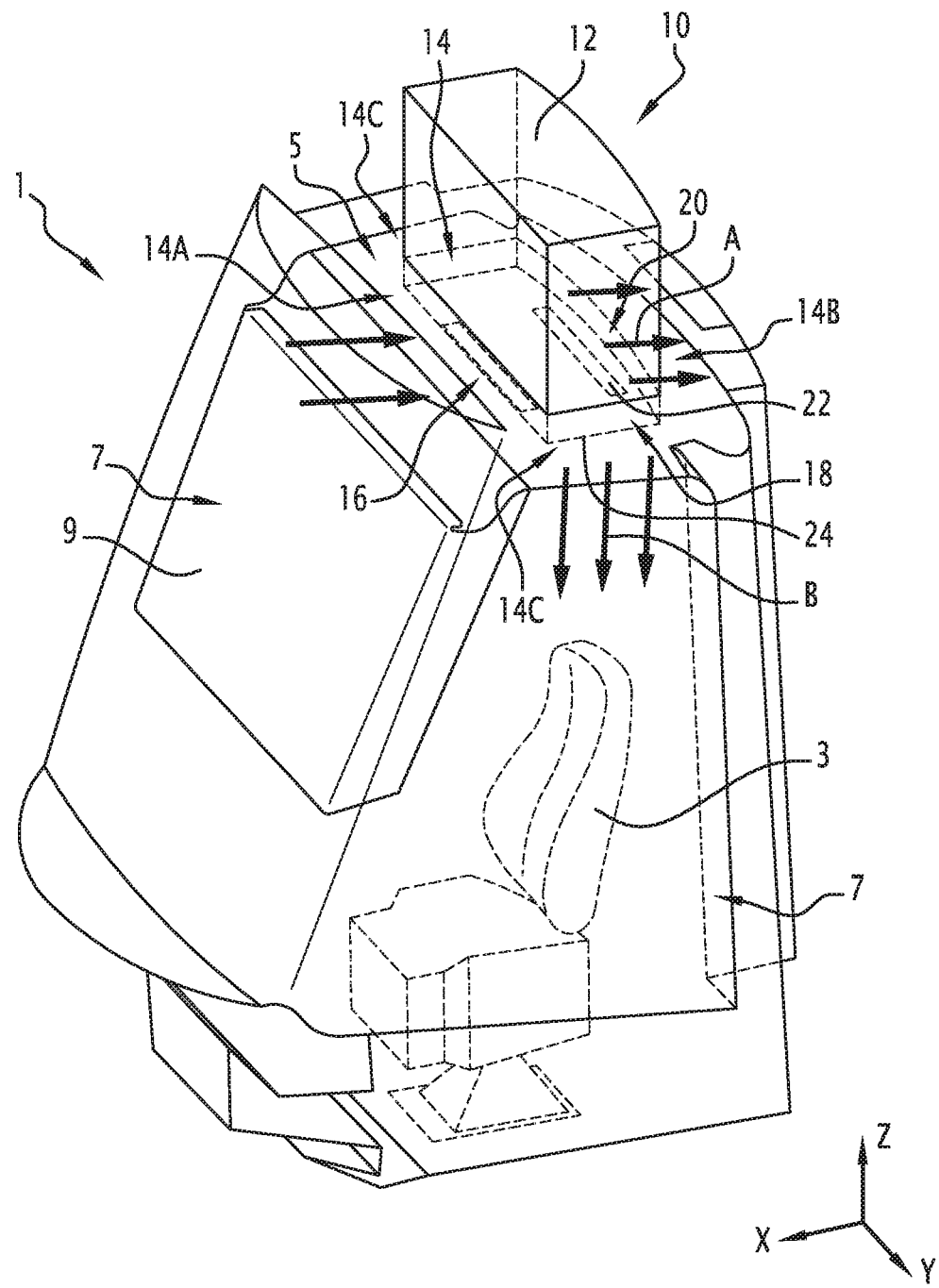

AIR CONDITIONING DEVICE FOR A DRIVING CABIN, IN PARTICULAR OF A RAILWAY VEHICLE

The present invention relates to an air conditioning device for a driving cabin, in particular of a railway vehicle. The invention can also be implemented for any driving cabin, for example a road transport vehicle, or a motor vehicle.

Already known in the state of the art is an air conditioning device for a driving cabin, including a heat exchanger able to exchange heat with the air circulating in the air conditioning device.

Air from the cabin penetrates the air conditioning device through an air inlet, then that air is conditioned by the heat exchanger, then the air conditioned air is blown into the cabin through an air outlet.

Typically, the air outlet is oriented toward at least one seat of the cabin, where a user is located, in particular a driver or a passenger. Yet the conditioned air blown toward the user can be considered uncomfortable for that user.

Furthermore, the temperature of the air in the cabin is not homogenous. More particularly, considering a first cabin zone toward which the conditioned air is blown, and a second cabin zone toward which the conditioned air is not blown, the first cabin zone may have a temperature difference, sometimes considerable, with respect to the second cabin zone.

The invention in particular aims to resolve these drawbacks by proposing an air conditioning device for a driving cabin, allowing a homogenous distribution of the temperature in the cabin, and not forming a source of discomfort for users.

To that end, the invention in particular relates to an air conditioning device for a driving cabin, in particular of a railway vehicle, including a heat exchanger intended to exchange heat with the air circulating in the air conditioning device, characterized in that it includes an air distribution box, extending in a longitudinal direction between a front part and a rear part, and in a transverse direction between two side parts, the distribution box being intended to be fastened to a ceiling of the driving cabin, and comprising:

in its front part, a front inlet for air coming from the cabin, connected upstream from the heat exchanger, and in each of its side parts, a respective side outlet for conditioned air, connected downstream from the heat exchanger.

The side air outlets are intended to diffuse the conditioned air toward the side walls of the cabin, generally side bays, thereby generating, on either side of the cabin, convection rolls that provide overall mixing of the air in the cabin, thus making it possible to homogenize the temperature of the air in the cabin.

An air conditioning device according to the invention can further comprise one or more of the following features, considered alone or in any technically possible combinations:

In its rear part, the distribution box includes a rear outlet for conditioned air, connected downstream from the heat exchanger.

The distribution box includes means for distributing the conditioned air from the heat exchanger, able to steer: between 35 and 45%, for example around 40%, of the conditioned air from the heat exchanger toward the rear air outlet, and between 27.5 and 32.5%, for example around 30%, of the conditioned air from the heat exchanger toward each side air outlet.

The rear conditioned air outlet includes a first member directing the flow of air, able to give the stream of air blown by that rear outlet a first predefined air blowing direction.

The first predefined air blowing direction is substantially parallel to the longitudinal direction.

The front air inlet has a generally rectangular shape with a length substantially equal to 600 mm and a width substantially equal to 23 mm, the rear air outlet has a generally rectangular shape with a length substantially equal to 600 mm and a width substantially equal to 12 mm, and each side air outlet has a generally rectangular shape with a length substantially equal to 300 mm and a width substantially equal to 25 mm.

Each side conditioned air outlet includes a second member directing the flow of air, able to give the stream of air blown by that side outlet a respective predefined second air blowing direction.

For each side outlet, the corresponding second predefined blowing direction forms an angle comprised between 20 and 25°, for example 22°, with a transverse plane perpendicular to the longitudinal direction, the conditioned air flow preferably being oriented toward the front.

For each side outlet, the corresponding second predefined blowing direction forms an angle comprised between 40 and 50°, for example 45°, with a longitudinal plane perpendicular to the transverse direction, the conditioned air flow preferably being oriented toward a side wall of the cabin.

The invention also relates to a driving cabin, in particular for a railway vehicle, defined heightwise by a ceiling, and defined in a transverse direction by two side walls, characterized in that it includes an air conditioning device as previously defined, the air distribution box of which is fastened to the ceiling, each side air outlet being arranged near a respective side wall.

The invention will be better understood upon reading the following description, provided solely as an example and done in reference to the appended FIGURE, which is a perspective view of a driving cabin including an air conditioning device according to one example embodiment of the invention.

The FIGURE shows a driving cabin 1, in particular a railway vehicle driving cabin 1, for example for a tram or subway.

Alternatively, the driving cabin 1 can be of any possible type, for example a driving cabin for a road transportation vehicle, in particular a truck, or for a motor vehicle.

The driving cabin 1 extends in a longitudinal direction X, which is the traditional longitudinal direction of the vehicle.

In the present description, the terms "front" and "rear" are considered in the longitudinal direction X, with their traditional direction in light of the travel direction of the vehicle.

The driving cabin 1 includes at least one seat 3 for a user, in particular a driver of the vehicle. The driving cabin 1 can also include a second seat for a passenger or driving assistant.

The driving cabin 1 is traditionally defined heightwise, in a vertical direction Z perpendicular to the longitudinal direction X, by a ceiling 5.

Furthermore, the driving cabin 1 is traditionally defined, in a transverse direction Y perpendicular to the longitudinal X and vertical Z directions, by two side walls 7. Each of the side walls 7 for example include a side bay.

Lastly, the driving cabin 1 is traditionally defined, in the longitudinal direction X, by a front windshield 9.

The driving cabin includes an air conditioning device 10, intended to modify the temperature in the driving cabin 1, by increasing or decreasing it, by taking air from the cabin, then blowing the conditioned air into that cabin. This conditioned air can be heated or cooled, based on the configuration of the air conditioning device 10.

The air conditioning device 10 includes a heat exchanger 12 of the traditional type, intended to exchange heat with the air circulating in the air conditioning device 10. This heat exchanger 12 is part of a traditional air conditioning unit, arranged above the driving cabin 1, in particular above the ceiling 5.

The air conditioning unit is generally reversible, i.e., it can, based on its configuration, take heat from the air coming from the cabin (in which case the conditioned air is cooled), or give heat to the air coming from the cabin (in which case the conditioned air is heated).

The air conditioning device 10 includes an air distribution box 14, extending in the longitudinal direction X between a front part 14A and a rear part 14B, and in the transverse direction Y between the symmetrical side parts 14C.

The distribution box 14 is fastened to the ceiling 5 of the driving cabin 1.

The distribution box 14 is connected to the heat exchanger 12, such that its front part 14A is upstream from the heat exchanger 12 in an air circulation direction in the air conditioning device 10, and its rear part 14B, as well as its side parts 14C, are situated downstream from the exchanger 12 in the air circulation direction in the air conditioning device 10.

More particularly, the distribution box 14 includes, in its front part 14A, a front inlet 16 for air coming from the driving cabin 1, connected upstream from the heat exchanger 12. Thus, the air from the cabin 1 penetrates the air conditioning device 10 through this front air inlet 16.

This front inlet 16 is for example arranged near the windshield 9.

The front air inlet 16 for example has a generally rectangular shape with a length (considered in the transverse direction Y) substantially equal to 600 mm and a width (considered in the vertical direction Z) substantially equal to 23 mm.

The distribution box 14 includes, in each of its side parts 14C, a respective side outlet 18 for conditioned air, connected downstream from the heat exchanger 12.

Each side outlet 18 is arranged near a respective one of the side walls 7 of the driving cabin 1.

Each side air outlet 18 for example has a generally rectangular shape with a length (considered in the longitudinal direction X) substantially equal to 300 mm and a width (considered in the vertical direction Z) substantially equal to 25 mm.

Lastly, in its rear part 14B, the distribution box 14 includes a rear outlet 20 for conditioned air, connected downstream from the heat exchanger 12.

The rear air outlet 20 for example has a generally rectangular shape with a length (considered in the transverse direction Y) substantially equal to 600 mm and a width (considered in the vertical direction Z) substantially equal to 12 mm.

The distribution box 14 includes means for distributing the conditioned air from the heat exchanger 12, able to distribute the conditions air toward the rear outlet 20 the side air outlets 18.

For example, these distribution means are configured to steer between 35 and 45%, for example around 40%, of the conditioned air from the heat exchanger 12 toward the rear air outlet 20, and between 27.5 and 32.5%, for example around 30%, of the conditioned air from the heat exchanger 12 toward each side air outlet 18.

Advantageously, the rear conditioned air outlet 20 includes a first member 22 directing the flow of air, able to give the stream of air blown by that rear outlet 20 a first predefined air blowing direction A. The first steering member 22 generally includes a diffusion grate, preferably made from metal, for example fastened to the distribution box 14 by screwing.

The first predefined air blowing direction A is substantially parallel to the longitudinal direction X. Thus, the conditioned air is blown through the rear outlet 20 toward the back of the driving cabin 1, and is therefore not steered toward the seat 3. This conditioned air therefore does not form a source of discomfort for the user seated on the seat 3.

Advantageously, each side conditioned air outlet 18 includes a second member 24 directing the flow of air, able to give the stream of air blown by that side outlet 18 a respective predefined second air blowing direction B. The second steering member 24 generally includes a diffusion grate, preferably made from metal, for example fastened to the distribution box 14 by screwing.

For each side outlet 18, the corresponding second predefined blowing direction B forms an angle comprised between 20 and 25°, for example 22°, with a transverse plane perpendicular to the longitudinal direction X, the conditioned air flow for example being oriented toward the front.

Furthermore, for each side outlet 18, the corresponding second predefined blowing direction B forms an angle comprised between 40 and 50°, for example 45°, with a longitudinal plane perpendicular to the transverse direction Y, the conditioned air flow preferably being oriented toward the corresponding side wall 7 of the driving cabin 1.

It clearly appears that the conditioned air leaving to the side outlet 18 makes it possible to manage the convection rolls, which ensure mixing of the air in the driving cabin 1, creating, in association with the conditioned air blown through the rear outlet 20, an overall movement of the volume of air in the cabin 1, which makes it possible to optimize the temperature of the air in the cabin 1.

The orientation of the conditioned air flow leaving through the side outlets 18 defined above makes it possible to optimize this generation of convection rolls.

It will be noted that the invention is not limited to the embodiment previously described, but could have various alternatives without going beyond the scope of the claims.

The invention claimed is:

1. An air conditioning device for a driving cabin, including a heat exchanger intended to exchange heat with the air circulating in the air conditioning device, wherein it includes an air distribution box, extending in a longitudinal direction between a front part and a rear part, and extending in a transverse direction between two side parts, the air distribution box being intended to be fastened to a ceiling of the driving cabin, and comprising:
   in the front part, a front air inlet for air coming from the driving cabin, connected upstream from the heat exchanger, and
   in each of the side parts, a respective side air outlet for conditioned air, connected downstream from the heat exchanger, and
   wherein:

each side air outlet includes a first member directing the flow of air, able to give the stream of air blown by that side outlet a respective first predefined air blowing direction, for each side air outlet, the corresponding first predefined air blowing direction forms an angle comprised between 20 and 25° with respect to a transverse plane perpendicular to the longitudinal direction, the conditioned air flow being oriented toward the front, and for each side air outlet, the corresponding first predefined air blowing direction forms an angle comprised between 40 and 50° with respect to a longitudinal plane perpendicular to the transverse direction, the conditioned air flow being intended to be oriented toward a side wall of the cabin.

2. The air conditioning device according to claim 1, wherein in its rear part, the air distribution box includes a rear air outlet for conditioned air, connected downstream from the heat exchanger.

3. The air conditioning device according to claim 2, wherein the air distribution box distributes the conditioned air from the heat exchanger, so as to steer:

between 35 and 45% of the conditioned air from the heat exchanger toward the rear air outlet, and between 27.5 and 32.5% of the conditioned air from the heat exchanger toward each side air outlet.

4. The air conditioning device according to claim 2, wherein the rear air outlet includes a second member directing the flow of air, able to give the stream of air blown by that rear air outlet a second predefined air blowing direction.

5. The air conditioning device according to claim 4, wherein the first predefined air blowing direction is parallel to the longitudinal direction.

6. The air conditioning device according to claim 2, wherein:

the front air inlet has a generally rectangular shape with a length equal to 600 mm and a width equal to 23 mm, the rear air outlet has a generally rectangular shape with a length equal to 600 mm and a width equal to 12 mm, each side air outlet has a generally rectangular shape with a length equal to 300 mm and a width equal to 25 mm.

7. A driving cabin, defined heightwise by a ceiling, and defined in a transverse direction by two side walls, wherein the driving cabin includes an air conditioning device, the air conditioning device including a heat exchanger intended to exchange heat with the air circulating in the air conditioning device, and including an air distribution box, extending in a longitudinal direction between a front part and a rear part, and in a transverse direction between two side parts, the air distribution box being intended to be fastened to the ceiling of the driving cabin, and comprising:

in the front part, a front air inlet for air coming from the cabin, connected upstream from the heat exchanger, and in each of the side parts, a respective side air outlet for conditioned air, connected downstream from the heat exchanger, and wherein the air distribution box is fastened to the ceiling, each side air outlet being arranged near a respective side wall, and wherein:

each side air outlet includes a first member directing the flow of air, able to give the stream of air blown by that side outlet a respective first predefined air blowing direction, for each side air outlet, the corresponding first predefined air blowing direction forms an angle comprised between 20 and 25° with respect to a transverse plane perpendicular to the longitudinal direction, the conditioned air flow being oriented toward the front, and for each side air outlet, the corresponding first predefined air blowing direction forms an angle comprised between 40 and 50° with respect to a longitudinal plane perpendicular to the transverse direction, the conditioned air flow being intended to be oriented toward a side wall of the cabin.

* * * * *